United States Patent [19]
Yu et al.

[11] Patent Number: 5,415,961
[45] Date of Patent: May 16, 1995

[54] FLEXIBLE BELT SUPPORTED ON RIGID DRUM FOR ELECTROPHOTOGRAPHIC IMAGING

[75] Inventors: Robert C. U. Yu, Webster; William G. Herbert, Williamson; William W. Limburg, Penfield; Satchidanand Mishra, Webster; Richard L. Post, Penfield; Donald C. Von Hoene; Geoffrey M. T. Foley, both of Fairport; Abraham Cherian, Webster, all of N.Y.

[73] Assignee: Xerox Corporation, Stamford, Conn.

[21] Appl. No.: 953,610

[22] Filed: Sep. 29, 1992

[51] Int. Cl.⁶ .................................. G03G 15/02
[52] U.S. Cl. ........................... 430/58; 430/69; 355/213; 198/845
[58] Field of Search ............ 430/60, 69, 62, 58; 355/212, 213; 198/845, 847

[56] References Cited

U.S. PATENT DOCUMENTS

| | | | |
|---|---|---|---|
| 4,711,833 | 12/1987 | McAneney et al. | 430/131 |
| 4,747,992 | 5/1988 | Sypula et al. | 264/130 |
| 5,039,598 | 8/1991 | Abramsohn et al. | 430/347 |
| 5,073,434 | 12/1991 | Frank et al. | 428/195 |
| 5,100,628 | 3/1992 | Griffiths et al. | 427/121 |
| 5,167,987 | 12/1992 | Yu | 427/171 |
| 5,308,725 | 5/1994 | Yu et al. | 430/56 |

FOREIGN PATENT DOCUMENTS 3144458  1/1991  Japan .

OTHER PUBLICATIONS

H. T. Mastalski, "Continuous Horizontal Coating System", Xerox Disclosure Journal, vol. 17, No. 2, Mar.-/Apr. 1992.

*Primary Examiner*—Steve Rosasco

[57] ABSTRACT

A method of fabricating a cylindrical device comprising having at least one distinct outer layer comprising providing a preformed rigid cylindrical support drum having a predetermined outer circumference, a first end and a second end, providing a flexible belt having an inner circumference at least about 0.05 percent smaller than the outer circumference of the support drum, circumferentially expanding the belt with a flowing fluid under pressure until the circumference of the inner surface of the belt adjacent the first end is stretched to a new dimension at least about 0.1 percent greater than the outer circumference of the support drum while maintaining an elongation strain less than the elastic limit of the belt, sliding the belt onto the support drum from the first end toward the second end of the support drum until substantially all of the belt encircles the outer surface of the support drum and terminating the flow of the flowing liquid to allow the belt to contract onto the outer surface of the support drum. The fluid may either be a gas or a liquid. The cylindrical device fabricated by this process is preferably an electrostatographic imaging member. This electrostatographic imaging member may be utilized in an electrostatographic imaging process.

11 Claims, 8 Drawing Sheets

FIG. 10
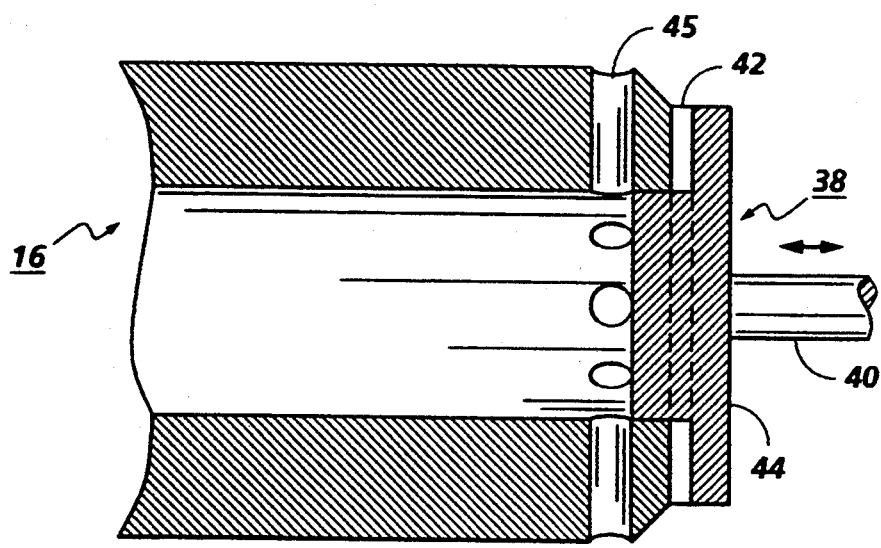
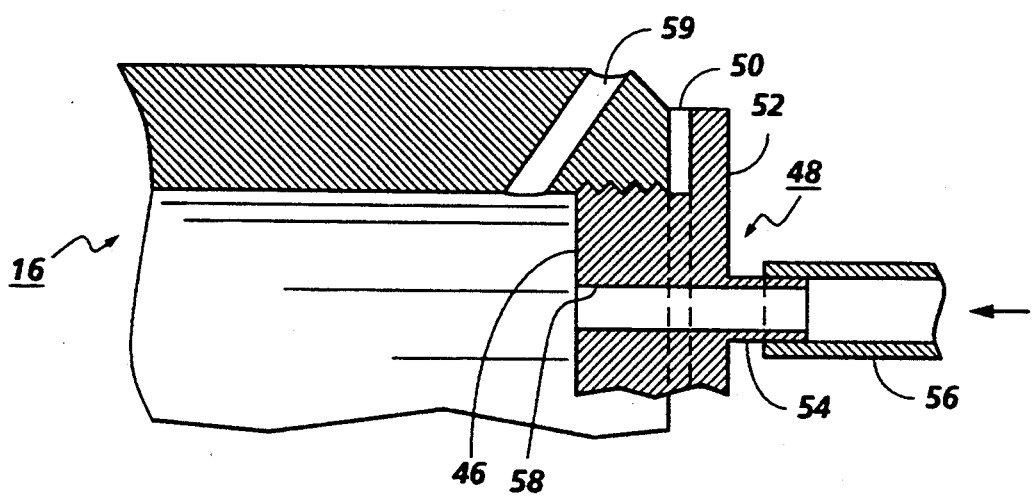
FIG. 11

FIG. 20
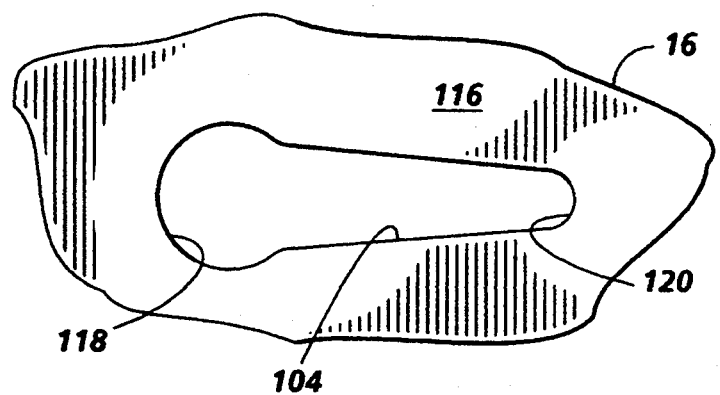
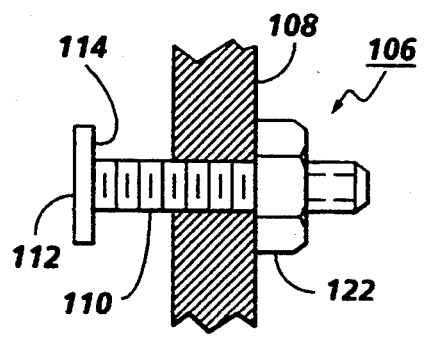
FIG. 21
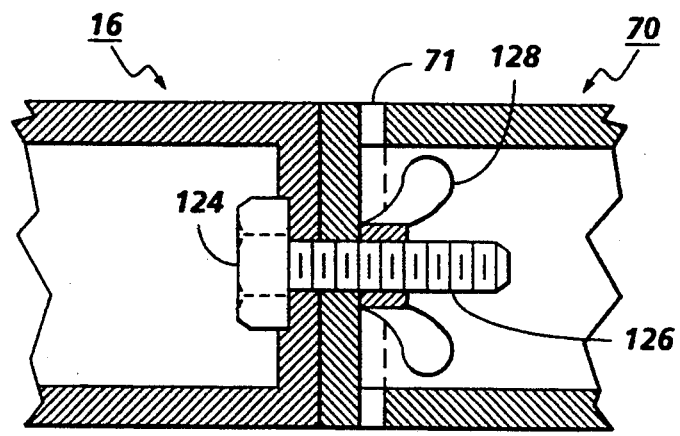
FIG. 22

FLEXIBLE BELT SUPPORTED ON RIGID DRUM FOR ELECTROPHOTOGRAPHIC IMAGING

BACKGROUND OF THE INVENTION

This invention relates in general to methods of fabrication of cylindrical devices comprising flexible tube or belt supported on a rigid cylindrical support member and the product of such fabrication method.

Coated cylinders are employed extensively in various arts. For example coated cylinders may be utilized as electrostatographic imaging members, drive rolls, calendaring rolls, fuser rolls, transport rolls, and the like. Similarly, flexible tubes or belts are commonly utilized for numerous purposes such as electrostatographic imaging members, conveyor belts, drive belts and the like.

Flexible electrostatographic imaging members, e.g. belts, are well known in the art. Typical electrostatographic flexible imaging members include, for example, photoreceptors for electrophotographic imaging systems, and electroreceptors or ionographic imaging members for electrographic imaging systems. Both electrophotographic and ionographic imaging members are commonly utilized in either a belt or a drum configuration. These electrostatographic imaging member belts may be seamless or seamed. For electrophotographic applications, the imaging members preferably have a belt configuration. These belts often comprise a flexible supporting substrate coated with one or more layers of photoconductive material. The substrates may be inorganic such as electroformed nickel or organic such as a film forming polymer. The photoconductive coatings applied to these belts may be inorganic such as selenium or selenium alloys or organic. The organic photoconductive layers may comprise, for example, single binder layers in which photoconductive particles are dispersed in a film forming binder or multilayers comprising, for example, a charge generating layer and a charge transport layer.

Electrophotographic imaging members having a belt configuration are normally entrained around and supported by at least two rollers. Generally, one of the rollers is driven by a motor to transport the belt around the rollers during electrophotographic imaging cycles. Since electrophotographic imaging belts, particularly welded seam belts, are not perfectly cylindrical and, more specifically, tend to be slightly cone shaped, these flexible belts tend to "walk" axially along the support rollers. Belt walking causes one edge of the belt to strike one or more edge guides positioned adjacent the ends of the rollers to limit axial movement. Friction between the edge guide and the edge of the photoreceptor belt can cause the belt to wear, rip, buckle and otherwise damage the belt.

Belts driven around supporting rollers can slip relative to the surface of the roller during stop and go operations. Belt slipping has been a serious problem when the surface contact friction between the backside of the imaging belt and the elastomeric outer surface of the drive roll is substantially reduced as a result of aging of the elastomeric material or deposition and accumulation of undesirable foreign material on the surface of the drive roll. This slippage can adversely affect registration of images, particularly where multiple, sequentially formed and transferred images must be precisely registered with each other in demanding applications such as color imaging. Further, where welded belt seams encounter slippage, sophisticated detection systems are required to ensure that images are not formed on the seam when the seam shifts due to slippage. Also, there are other serious drawbacks in terms of belt tracking and problems with good image registration. Welded belts, because of the difficulties associated with perfectly aligning overlapping ends during seam welding, are not as concentric as desired.

Often, the supporting rollers for an electrophotographic imaging belt have relatively small diameters. Constant flexing of the belt around small diameter support rollers can cause the seam to crack. The cracks propagate and cause belt delamination because of the flexing as well as fatigue. In addition to these seam cracking and delamination problems, dynamic flexing of the belt around the small diameter support rollers also causes cracking of the outer imaging layer. Cracking of the outer imaging layer leads to copy print defects.

The region of a belt located between supporting rollers can vibrate and undesirably alter the often critical distances between the belt imaging surface and devices such as optical exposure means, charging corotrons, development applicators, transfer stations and the like.

In addition, the anti-curl back coating on a belt tends to wear during cycling and such wear reduces the effectiveness of the anti-curl back coating from preventing curling of the edges of the belt. Curling of the belt also adversely affects the critical distances between the belt imaging surface and adjacent processing stations.

Another type of electrophotographic imaging members that is well known in the art are drum type photoreceptors. Some photoreceptors are coated with one or more coatings. Coatings may be applied by well known techniques such as dip coating or spray coating. Dip coating of drums usually involves immersing of a cylindrical drum while the axis of the drum is maintained in a vertical alignment during the entire coating and subsequent drying operation. Because of the vertical alignment of the drum axis during the coating operation, the applied coatings tend to be thicker at the lower end of the drum relative to the upper end of the drum due to the influence of gravity on the flow of the coating material. Coatings applied by spray coating can also be uneven, e.g., orange peel effect. Coatings that have an uneven thickness do not have uniform electrical properties at different locations of the coating. Also, the coating of drums in a batch operation is time consuming and costly. In addition, the many handling steps required for batch drum coating processes tend to increase the likelihood that one or more coatings will be damaged or contaminated. Moreover, dip or spray coated photoreceptor drums do not exhibit the superior electrophotographic characteristics of flexible electrostatographic imaging belts. Moreover, the coatings are difficult to remove without damaging the underlying drum during reclaiming operations thereby rendering the drum unsuitable for recycling.

Similar difficulties have been experienced with fabrication of other types of coated drums such as coated fuser rolls and sheet transport rolls.

INFORMATION DISCLOSURE STATEMENT

U.S. Pat. No. 4,711,833 issued to T. McAneney et al on Dec. 8, 1987—A process is disclosed for fabricating seamless belts comprising providing a mandrel coated with a release coating, depositing a polymer by electrostatic spraying, melting the polymer and cooling the polymer. The resulting seamless belt is removed from the mandrel prior to or after application of a ground plane layer, photogenerating layer and charge generating layer. After formation of the coated or uncoated belt, air pressure is applied to the interior of the mandrel. The air passes through holes at one end of the mandrel to lift and break the adhesive bond between the inside surface of the seamless coated or uncoated belt and the mandrel surface. The air pressure is then released and the seamless coated or uncoated belt is easily slipped off the mandrel.

U.S. Pat. No. 4,747,992 issued D. Sypula to et al on May 31, 1988—A process is disclosed for forming a seamless belt comprising forming at least one thin uniform fluid coating of a film forming polymer on a cylindrical mandrel having a larger mass, lower thermal conductivity or larger mass and lower thermal conductivity than the film forming polymer and a critical surface tension greater than the surface tension of the fluid coating to form at least one thin coating around the mandrel, heating both the mandrel and the coating to a temperature above the apparent $T_g$ of the solid coating to expand the coating and mandrel, cooling the coating below the apparent $T_g$ of the solid coating prior to substantial cooling of the mandrel, cooling the mandrel whereby the mandrel contracts at a greater rate than the coating until separation occurs between the mandrel, and removing the coating from the mandrel. A fluid of air or liquid may be introduced at one or both ends of the mandrel between the mandrel surface and the deposited belt to reduce adhesion between the mandrel and the coating prior to removing the coating from the mandrel.

U.S. Pat. No. 5,039,598 issued to Abramsohn et al. on Aug. 13, 1991—A process is disclosed for preparing ionographic imaging members including providing a flexible-shrinkable tube containing a dielectric film-forming polymer having a certain $T_g$, charge decade and elastic memory properties, providing a cylindrical support member having an outer diameter that is less than the inner diameter of the flexible tube, applying a continuous coating of the interior of the tube or the exterior the cylindrical support member, the coating comprising an electrically conductive material, an adhesive material or mixture thereof, shrinking the tube to bring the inner surface of the tube and the outer surface of the cylindrical support member into intimate physical contact with the continuous coating. The tube may be worked to expand the diameter so that it will fit over a cylindrical metal or conductive roll substrate. For example, one may inflate an elastomeric tube with the pressurized fluid by sealing one end of the tube and introducing the pressurized fluid into the interior of the tube through the other end. For example, one may seal the end of the tube by inserting a tapered stopper, or by pinching or heat sealing the end and later trimming the end to fix the substrate. The cylindrical support member can thereafter be inserted within the flexible tube while the tube is in the inflated state. Subsequent removal of the pressurized fluid allows the tube to shrink around the cylindrical support member.

U.S. Pat. No. 5,073,434 issued to J. Frank et al. on Dec. 17, 1991—An ionographic imaging member is disclosed containing a conductive layer and a uniform continuous dielectric imaging layer, the imaging layer having a certain dielectric constant, thickness relationship.

U.S. Pat. No. 5,100,628 issued to C. Griffiths et al. on Mar. 21, 1992—A method and apparatus for coating photoreceptors using copying machines is disclosed in which, prior to coating, an elastically deformable material is placed around the external surface of mandrel to accommodate a belt. The thickness of the material is such that when the belt is pushed over the mandrel the deformable material is deformed and engages the interior surfaces of the belt facing the mandrel. As a result of heating and cooling steps involved during the coating process the belt contracts and expands differently than the mandrel. After coating, the coated belt is removed from the mandrel.

When tubes are formed on a mandrel by coating operations and thereafter removed, the interior circumference of the tubes is normally equal to the exterior circumference of the mandrel. Thus, there is little or no compressive forces in the tube itself to aid in the prevention of slippage between the tube and the mandrel.

When flexible tubes are sealed at one end and inflated from the other end by means of a pressurized fluid to facilitate introduction of a support cylinder, the material is stretched circumferentially as well as axially. This two dimensional stretching operation is undesirable because the axial dimension (i.e. length) of the tube will contract with respect to the cylindrical support substrate after mounting, thereby exposing the edges of the cylindrical support substrate. Additionally, such an operation requires the use of an elaborate pressurized chamber which must also house the support cylinder that is inserted into the interior of the tube while the tube is in a stretched, pressurized condition.

Heat shrinking of a tube onto a mandrel can damage thermally sensitive coatings.

Thus, there is a continuing need for improved cylindrical devices, particularly electrostatographic imaging members having improved electrostatographic imaging properties.

SUMMARY OF THE INVENTION

It is, therefore, an object of the present invention to provide an improved method for fabricating cylindrical devices and products that overcome the above-noted disadvantages.

It is another object of the present invention to provide an improved cylindrical device, particularly electrostatographic imaging members, that captures the best attributes of both belt and drum designs without their respective shortcomings.

It is yet another object of the present invention to provide an improved cylindrical device, particularly electrostatographic imaging members, utilizing a flexible belt that exhibits superior tracking during cycling.

It is a further object of the present invention to provide an improved cylindrical device, particularly electrostatographic imaging members, having extended functional life.

It is still another object of the present invention to provide an improved electrostatographic imaging member which facilitates registration of images.

It is a further object of the present invention to provide an improved electrostatographic imaging member which exhibits longer life during repeated cycling.

It is yet another object of the present invention to provide an improved cylindrical device that can more readily be recycled.

The foregoing objects and others are accomplished in accordance with this invention by providing a method of fabricating a cylindrical device comprising having at least one distinct outer layer comprising providing a preformed rigid cylindrical support drum having a predetermined outer circumference, a first end and a second end, providing a flexible belt having an inner circumference of at least about 0.05 percent smaller than the outer circumference of the support drum, circumferentially expanding the belt with a flowing fluid under pressure until the circumference of the inner surface of the belt adjacent the first end is stretched to a new dimension of at least about 0.1 percent greater than the outer circumference of the support drum while maintaining the belt below the elastic limit of the belt, sliding the belt onto the support drum from the first end toward the second end of the support drum until substantially all of the belt encircles the outer surface of the support drum and terminating the flow of the flowing liquid to allow the belt to contract onto the outer surface of the support drum. The fluid may either be a gas or a liquid. The cylindrical device fabricated by this process is preferably an electrostatographic imaging member. This electrostatographic imaging member may be utilized in an electrostatographic imaging process.

BRIEF DESCRIPTION OF THE DRAWINGS

A more complete understanding of the device and process of the present invention can be obtained by reference to the accompanying drawings wherein:

FIG. 10 is a schematic illustration of a section of a rigid cylindrical support drum fitted with a removable end plug.

FIG. 11 is a schematic illustration of one embodiment of a section of a rigid cylindrical support drum fitted with a removable fluid supply cap.

FIG. 20 is an end view of a schematic illustration of another embodiment of a slot for a locking lug to join one end of a rigid cylindrical support drum to another member.

FIG. 21 is a side view of a schematic cross sectional illustration of a locking lug for use with the slot shown in FIG. 20.

FIG. 22 is a side view of a schematic cross sectional illustration of a bolt and butterfly locking nut embodiment for joining one end of a rigid cylindrical support drum to another member.

These figures merely schematically illustrate the invention and are not intended to indicate relative size and dimensions of the imaging belt, rigid cylindrical support drum or components thereof.

DETAILED DESCRIPTION OF THE DRAWINGS

For the sake of convenience, the invention will be described in relation to fabrication of cylindrical devices comprising a rigid cylindrical support drum having at least one distinct outer layer such as a flexible electrostatographic imaging belt under tension. The invention, however, is applicable to other cylindrical devices comprising a rigid cylindrical support drum having at least one distinct outer layer such as a fuser roll, drive roll, developer applicator, idler roll and the like.

Figure 1:
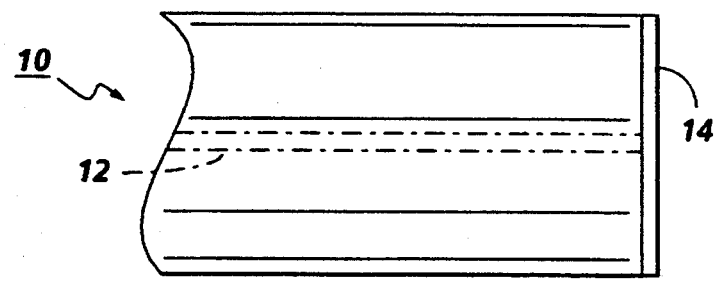
FIG. 1 is a schematic illustration of a section of a flexible seamed belt.

Referring to FIG. 1, a flexible seamed electrostatographic imaging belt 10 is shown having a welded seam 12 extending transversely across the width of belt 10 and an electrically conductive ground strip 14 along one edge.

Figure 2:
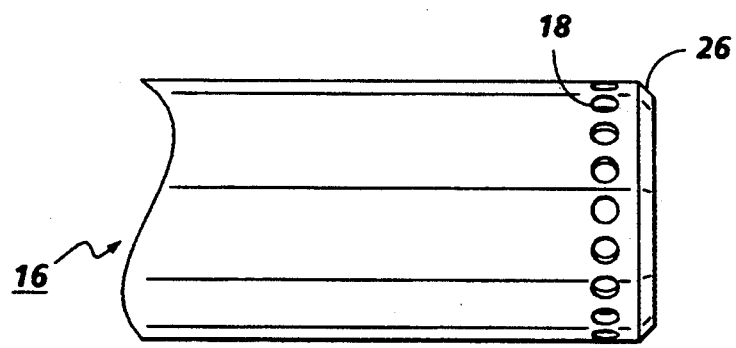
FIGS. 2 through 5 are schematic illustrations of segments of rigid cylindrical support drum embodiments with various vent aperture shapes and locations.
Figure 3:
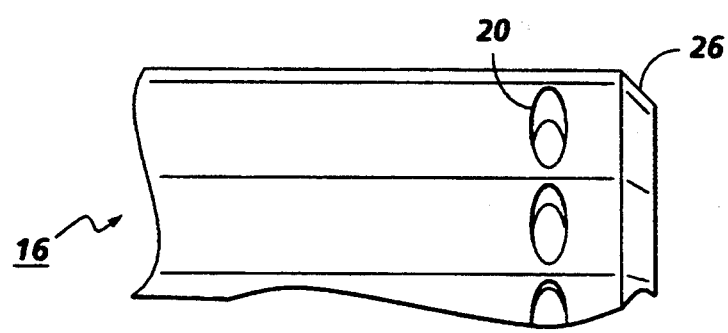
Figure 4:
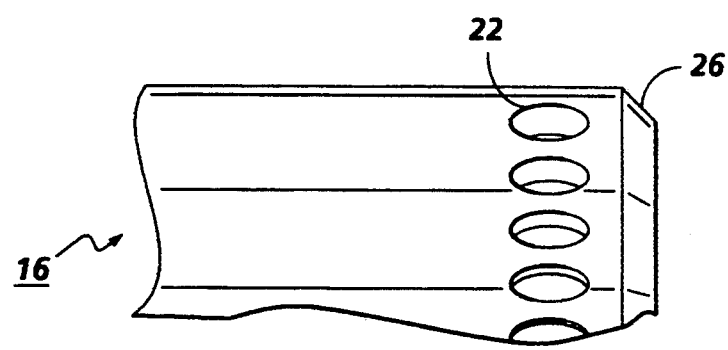
Figure 5:
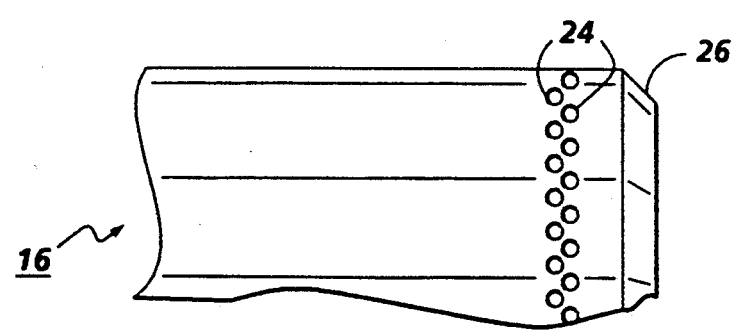

In FIGS. 2 through 5, various embodiments of fluid feed aperture shapes, sizes and placement are shown adjacent one end of a rigid cylindrical support drum 16. In FIG. 2, the feed apertures 18 are round and positioned in a single row around the periphery of support drum 16. Oval apertures 20 and 22 are shown in single rows at one end of a support drum 16 in FIGS. 3 and 4, respectively. Two rows of staggered apertures 24 are shown at one end of support drum 16 in FIG. 5. The end of support drum 16 adjacent the apertures shown in FIGS. 2 through 5 are chamfered to form a beveled surface 26 which serves as an aid for sliding belt 10 onto support drum 16. In all of the embodiments illustrated in FIGS. 2 through 5, the apertures 18, 20, 22 and 24 are spaced a short distance from the outermost edge of beveled surface 26.

Figure 6:
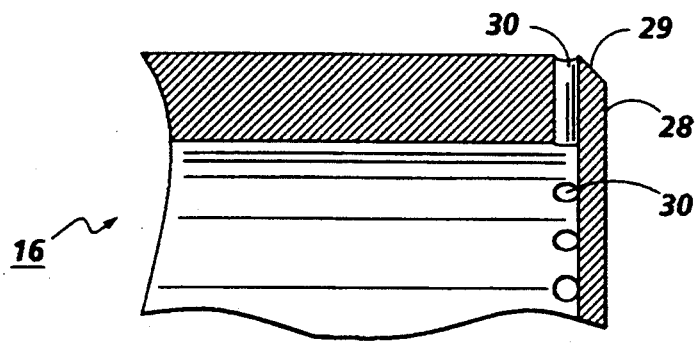
FIGS. 6 through 8 are schematic illustrations of segments of rigid cylindrical support drum embodiments having different end shapes and wall thicknesses.
Figure 7:
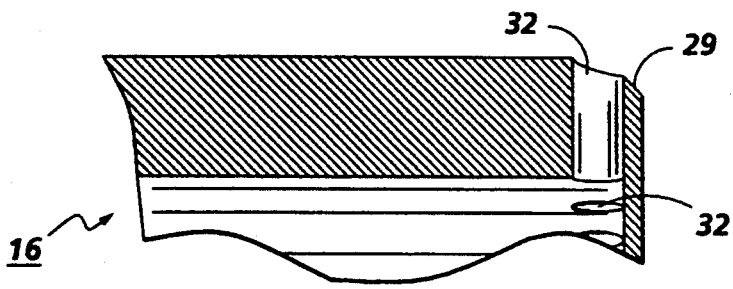
Figure 8:
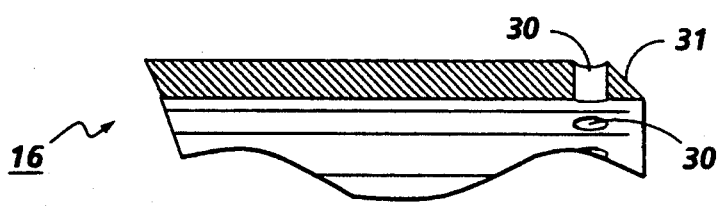

Referring to FIGS. 6 through 8, various drum end configurations are shown. In FIG. 6 the end of support drum 16 is sealed by an integral wall 28 or a removable flat disk shaped member. Wall 28 has a beveled edge or surface 29. The outermost edge (relative to the drum axis) of beveled surface 29 tangentially contacts the outer edge of apertures 30. Also, In FIG. 7, the outer edge of aperture 32 extends into beveled surface 29. The relatively thin support drum 16 shown in FIG. 8 has a beveled end 31 and aperture 30, but without the integral wall such as the integral wall 28 illustrated in FIG. 6.

Figure 9:
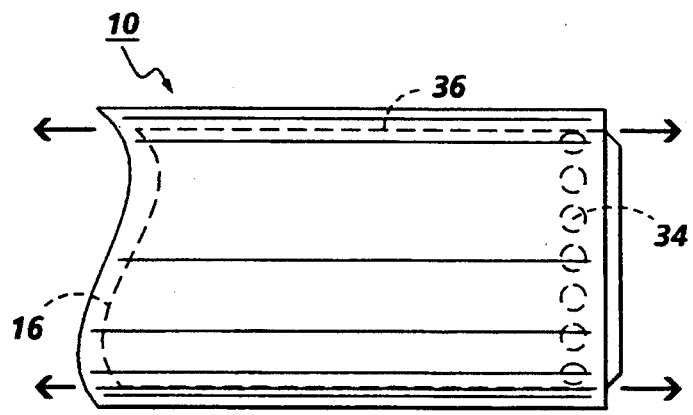
FIG. 9 is a schematic illustration of a section of a flexible seamed belt surrounding a rigid cylindrical support drum.

In FIG. 9, a flexible electrostatographic imaging belt 10 is illustrated surrounding and coaxially aligned with support drum 16, but separated therefrom by a thin film of pressurized fluid introduced through apertures 34 into the space between the inner surface of belt 10 and outermost surface 36 of support drum 16 and expelled at each end of belt 10 as shown by the arrows.

Referring to FIG. 10, support drum 16 is sealed at one end by a removable end plug 38 carried on the end of reciprocatable shaft 40. A gasket 42 of resilient material is positioned between support drum 16 and lip 44 of flange 38 to enhance achievement of a fluid tight seal. Although removable end plug 38 is shown in FIG. 10 at the end of support drum 16 having apertures 45, it may be used at the opposite end, if desired.

FIG. 11 shows support drum 16 with the inner surface of one end threaded to receive a threaded male extension 46 of a removable fluid supply cap 48. A gasket 50 of resilient material is positioned between support drum 16 and lip 52 of flange 48 to enhance achievement of a fluid tight seal. Cap 48 also comprises a tubular extension 54 around which one end of fluid supply tube 56 is mounted. Fluid from any suitable source such as a compressed air tank (not shown) is introduced into the interior of support drum 16 from fluid supply tube 56 through channel 58 extending through cap 48. The fluid introduced into the interior of support drum 16 is expelled through a plurality of inclined apertures 59. Although removable fluid supply cap 48 is shown in FIG. 11 at the end of support drum 16 having apertures 59, it may be used at the opposite end or both ends of support drum 16, if desired.

Figure 12:
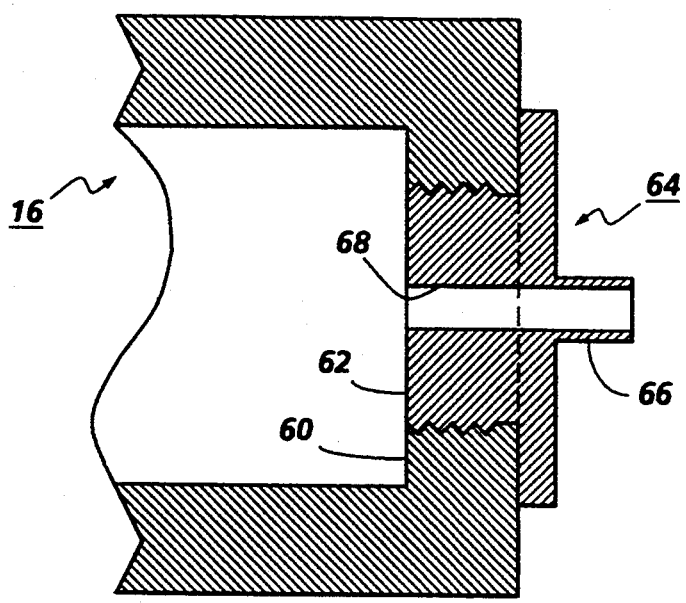
FIG. 12 is a schematic illustration of another embodiment of a section of a rigid cylindrical support drum fitted with a removable fluid supply cap.

In FIG. 12, support drum 16 has one end partially closed by annular wall 60. The periphery of the opening in annular wall 60 is threaded to receive a threaded male extension 62 of a removable fluid supply cap 64. Removable fluid supply cap 64 also comprises a tubular extension 66 to which a fluid supply tube (not shown) may be connected. Fluid can be introduced into the interior of drum 16 through channel 68 extending through fluid supply cap 64. Although removable fluid supply cap 64 is shown in FIG. 12 at the end of support drum 16 having no apertures, it may be used at the opposite end or both ends of support drum 16, if desired.

Figure 13:
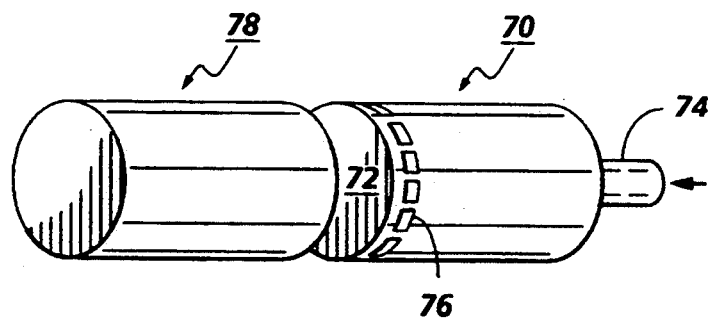
FIG. 13 is a schematic illustration of either a belt adjacent one end of a rigid cylindrical support drum or a rigid cylindrical support drum adjacent one end of a temporary imaging belt transport drum.

Referring to FIG. 13, a hollow cylinder 70 is shown with one end 72 closed and the opposite end essentially closed except for a fluid supply tube 74 for supplying fluid into the interior of hollow cylinder 70. The outermost surface of hollow cylinder 70 carries rectangular shaped apertures 76 near end 72. Depending upon the objectives desired, cylindrical member 78 may represent a flexible imaging belt or a rigid cylindrical support drum and hollow cylinder 70 may represent a rigid cylindrical support drum or a temporary imaging belt transport drum. In the embodiment where cylindrical member 78 represents a flexible imaging belt, it is intended that hollow cylinder 70 represents a rigid cylindrical support drum. In the embodiment where cylindrical member 78 represents a rigid cylindrical support drum, it is intended that hollow cylinder 70 represents a temporary imaging belt transport drum from which an imaging belt (not shown) is slid from hollow cylinder 70 onto cylindrical device 78 while fluid flowing under pressure is supplied through apertures 76.

Figure 14:
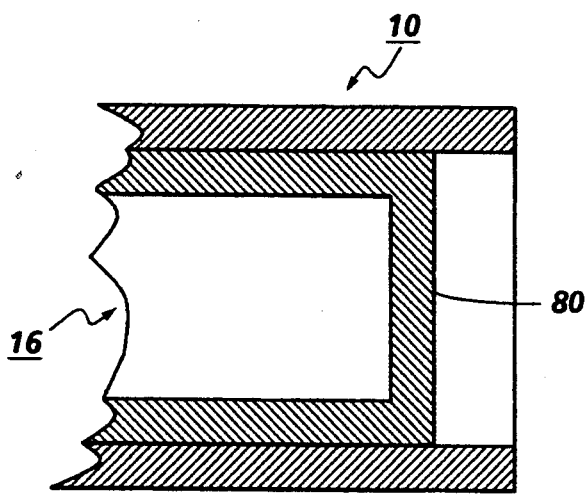
FIG. 14 is a schematic illustration of a flexible belt supported on a rigid drum substrate which shows belt overhang.

In FIG. 14 is an imaging belt 10 is shown supported on a rigid cylindrical support drum 16. Although part of one end of belt 10 is shown overhanging the closed end 80 of support drum 16, one or both edges of belt 10 may optionally overhang, or be flush with or be set back from the closed end 80 of support drum 16. This overhanging material may remain during use of the finished product or be trimmed off by suitable means such as a knife blade.

Figure 15:
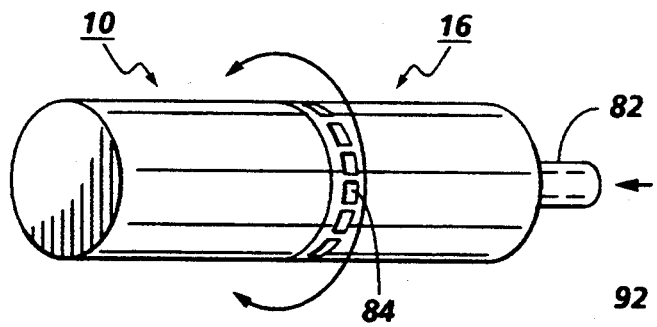
FIG. 15 is a schematic illustration of a section of a flexible belt being mounted onto a rigid cylindrical support drum.

Illustrated in FIG. 15, is an imaging belt 10 that is being slid onto a rigid cylindrical support drum 16 as a fluid is introduced into the hollow interior of rigid cylindrical support drum 16 via inlet conduit 82 and allowed to exit from the interior of the rigid cylindrical support drum 16 through apertures 84. A twisting motion represented by the arrow may, if desired, be imparted to imaging belt 10 to aid mounting of belt 10 onto support drum 16 as the fluid expands and stretches imaging belt 10. Alternatively, support drum 16 may be twisted instead of belt 10 or both belt 10 and support drum 16 may be simultaneously twisted in opposite directions during the mounting process. Once imaging belt 10 is fully mounted onto support drum 16, the flow of fluid through conduit 82 may be terminated or reduced to allow imaging belt 10 to contract onto support drum 16. Removal of belt 10 from rigid cylindrical support drum 16 may be effected by pulling belt 10 from support drum 16 while a fluid is forced out of apertures 84. Removal of belt 10 is desirable for replacement reasons.

Figure 16A:
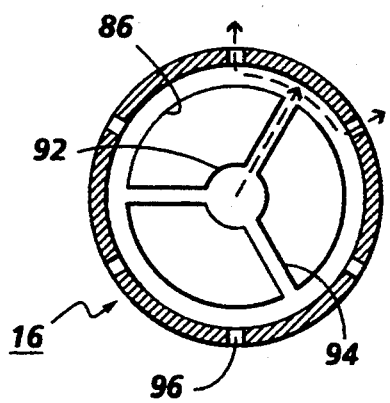
FIGS. 16 (a) through (c) are schematic cross sectional illustrations of rigid cylindrical support drums with various embodiments of fluid feed line and manifold configurations to feed fluid to vent apertures.
Figure 16B:
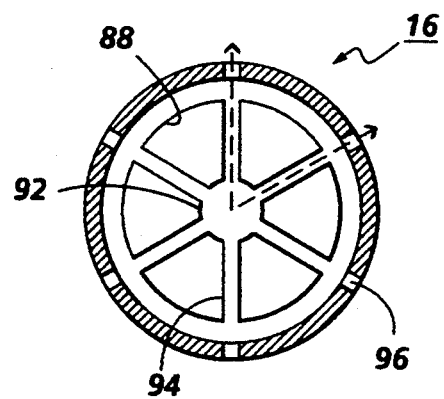
Figure 16C:
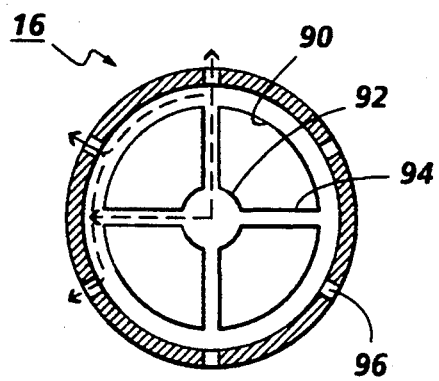

Referring to FIGS. 16 (a), (b) and (c), schematic cross sectional views are shown of various manifold configurations 86, 88 and 90 which are utilized to distribute fluid supplied via conduit 92 and feed lines 94 to vent channels 96. The use of conduits 92 and feed lines 94 reduce the amount of fluid needed to achieve the desired stretching thereby accelerating the belt mounting process.

Figure 17:
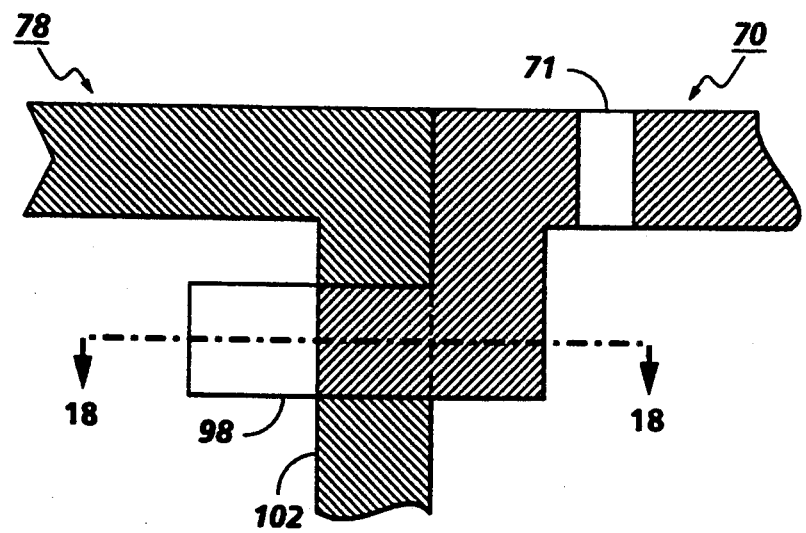
FIG. 17 is a side view of a schematic cross sectional illustration of a locking lug and slot embodiment to join one end of a rigid cylindrical support drum to another member.
Figure 18:
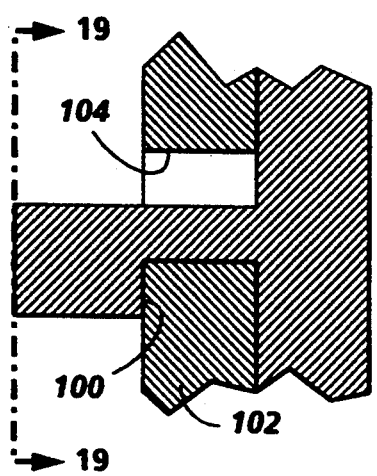
FIG. 18 is a plan view of the schematic cross sectional illustration of the locking lug and slot embodiment shown in FIG. 17.
Figure 19:
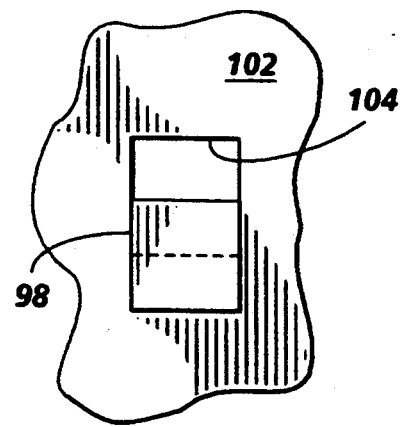
FIG. 19 is an end view of the schematic cross sectional illustration of the locking lug and slot embodiment shown in FIGS. 17 and 18.

In FIGS. 17, 18 and 19, a temporary locking arrangement embodiment is shown for maintaining the ends of transport drum 70 (serving as a temporary imaging belt transport drum) and rigid cylindrical support drum 78 (see FIGS. 13 and 17) together while an electrostatographic imaging belt (not shown) supported by continuously flowing fluid under pressure introduced through apertures 71 is slid from hollow cylinder 70 onto rigid cylindrical support drum 78. An "L" shaped lug 98 extends from one end of transport drum 70. This "L" shaped lug 98 has a lip 100 adapted to engage inner wall 102 of support drum 78 to achieve temporary locking of the two devices together (see FIGS. 18 and 19). Locking is initiated by inserting "L" shaped lug 98 through slotted opening 104 in wall 102 of support drum 78. Locking is completed by twisting transport drum 70 and/or support drum 78 to slide lip 100 over inner wall 102 of rigid cylindrical support drum 78. Disengagement of transport drum 70 from support drum 78 may be achieved by reversing the engagement steps. Alternatively, the "L" shaped lug may carried by support drum 78 and slotted opening 104 may be formed in the end wall of transport drum 70 (not shown).

Shown in FIGS. 20 and 21 is a schematic illustration of another temporary locking embodiment utilizing a keyhole slot 104 (see FIG. 20) into which a locking lug 106 (see FIG. 21) is inserted to join one end of a rigid cylindrical support drum 16 to one end of transport drum 108. Locking lug 106 comprises a threaded shaft 110 screwed into a threaded hole in one end of transport drum 108. Threaded shaft 110 comprises a flat cap 112 having a lip 114 which engages the inner surface 116 of rigid cylindrical support drum 16 after locking lug 106 is inserted into the large end 118 of keyhole slot 104 and slid toward the narrow end 120. A lock nut 122 secures threaded shaft 110 in place.

In FIG. 22, still another temporary locking embodiment in which one end of a rigid cylindrical support drum 16 is temporarily secured and abutted to one end of transport drum 70. In this embodiment, a bolt having a hexagonal head 124 is inserted into a hexagonal recess in one end of rigid cylindrical support drum 16 the threaded portion 126 of the bolt extends through a hole in the ends of rigid cylindrical support drum 16 and transport drum 70. Tightening of wing nut 128 on threaded portion 126 of the bolt temporarily maintains the ends of rigid cylindrical support drum 16 and transport drum 70 together. If desired, the direction of the bolt may be reversed (not shown) so that the threaded portion 126 extends into the interior of rigid cylindrical support drum 16 instead of into the interior of transport drum 70. In this latter embodiment, wing nut 128 would be tightened onto threaded portion 126 from the opposite side. In still another embodiment (not shown), the threaded portion 126 may be in the form of a permanent stud extending from the end of transport drum 70.

Figure 23:
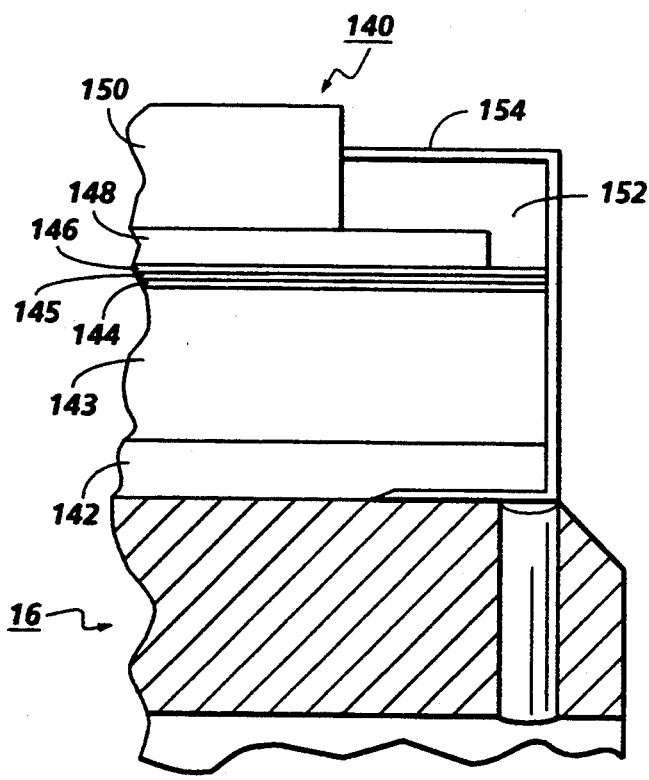
FIG. 23 is a schematic cross sectional illustration of a rigid cylindrical support drum supporting an electrostatographic imaging belt having an electrically conductive paint extending from the outwardly facing surface of a ground strip layer to the rear surface of belt.

Shown in FIG. 23, is a cross-sectional view of a metallic electrically conductive rigid cylindrical support drum 16 supporting an electrostatographic imaging belt 140. For purposes of illustration, the scale of the layers of belt 140 has been greatly exaggerated. Belt 140 comprises an anti-curl backing layer 142, a flexible supporting substrate 143, an electrically conductive layer 144, a charge blocking layer 145, an adhesive layer 146, a charge generating layer 148, a charge transport layer 150 and a ground strip layer 152 located along one edge of belt 140. A thin electrically conductive paint stripe 154 extends from the outwardly facing surface of ground strip layer 152 around the edge of belt 140 to the rear surface of belt 140. If desired, an electrically conductive adhesive tape, electrically conductive glue or other suitable means (not shown) may be substituted for electrically conductive paint stripe 154. The electrically conductive rigid cylindrical drum 16 functions as a path through a drum support shaft (not shown) to ground or to an electrical bias source (not shown).

Figure 24:
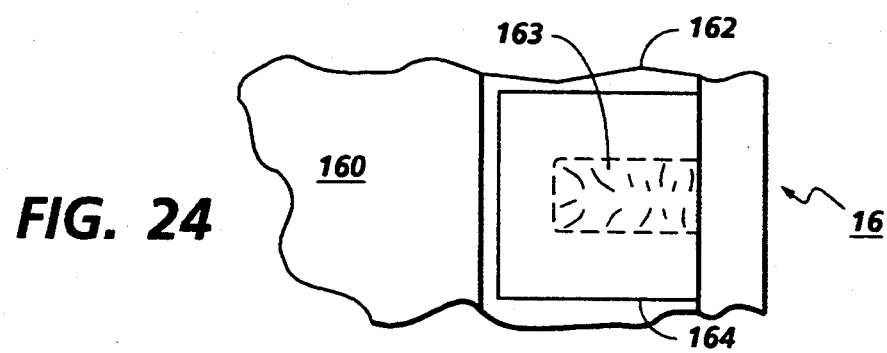
FIG. 24 is a plan view of a sectional illustration of a rigid cylindrical support drum supporting an electrostatographic imaging belt with an electrically conductive adhesive tape applied to both a ground strip layer of the belt and the exposed surface of drum 16.

In FIG. 24, a plan view of a metallic electrically conductive rigid cylindrical support drum 16 supporting an electrostatographic imaging belt 160 is illustrated. Belt 160 comprises layers similar to belt 140 shown in FIG. 24. A small segment of ground strip layer 162 and all underlying layers located along one edge of belt 160 have been removed (inside border of the segment removed is shown by a phantom line 163) to expose the underlying electrically conductive surface of drum 16. An electrically conductive adhesive tape 164 is applied to both the ground strip layer 162 and the exposed surface of drum 16 to electrically connect ground strip layer 162 and drum 16.

Any suitable thin flexible belt may be mounted on the rigid cylindrical support drum. Flexible belts, such as thin electrostatographic imaging belts, are well known in the art. Typical thin flexible electrophotographic imaging belts are described, for example, in U.S. Pat. Nos. 4,265,990, 4,747,992, 4,711,833 and 3,713,821, the entire disclosures of these patents being incorporated herein by reference. The flexible belt may have a welded seam or may be seamless. The belt should be flexible and stretchable. The expression "flexible", as used herein, is defined as bendable without exhibiting mechanical failure such as when cycled around various sizes of conventional support rollers during electrostatographic imaging in an automatic copier, duplicator or printer. The word "stretchable", as utilized herein, is defined as readily extendible to a moderate strain without rupture in response to an applied stress. Preferably, the belt should be capable of stretching to at least greater than about 0.1 percent strain without exceeding its elastic limit. The expression "elastic limit" as employed herein is defined as the maximum elongation a material can be extended such that the material is able to retract precisely to its original dimension upon the release of the applied extension force. In general, the elastic limit is determined from the linear region of a stress-strain relationship plot in which the strain is directly proportional to the applied stress. Within this limit, a material under stress will retract and recover its original dimension due to elastic contraction when the applied stress is removed.

The belt may comprise any suitable inorganic materials, organic materials or combinations of inorganic and organic materials that are flexible and stretchable. The belt may comprise one or more layers of any suitable flexible and stretchable thermoplastic film forming polymer, thermosetting film forming polymer, metal, or the like. Typical thermoplastic film forming polymers include polyethylene, terephthalate polymers, polycarbonates, polysulfone, polyacrylates, polyarylates, polyvinylidene fluoride, polyvinyl chloride, polystyrene, and the like. Typical thermosetting polymers include rubbers, cross-linked polyurethanes, phenolic resins, epoxy resins, vulcanized rubbers, cross-linked silicones, and the like. Typical metals include nickel, selenium, chromium, zirconium, titanium, gold, copper, and the like. The exposed surfaces of belts to be mounted on a rigid cylindrical support drum for use in fusing thermoplastic electrostatographic toner images preferably comprise well known flexible and stretchable adhesive material. Typical adhesive materials include polymers such as fluorocarbon polymers, polysiloxanes, waxy polyethylene, waxy polypropylene, and the like.

For electrostatographic imaging belts having a seam, the outer circumference of the belt after mounting and contracting on a rigid cylindrical drum, for imaging applications, is preferably at least about as long as the width of the receiving member to which a toner image is transferred to ensure that the entire receiving member surface can be imaged with transferred toner material. Belts having a seam are usually formed by welding the overlapped ends of a cut sheet with the welded seam extending from one edge to the opposite edge of the imaging belt in a direction parallel to the axis of the belt. Generally, the outer circumference of a seamed belt is preferably at least about 22 centimeters in order to provide adequate surface area to accommodate the width of a conventional size toner image receiving member (i.e., a standard size 8.5 inch (22 cm)×11.5 inch (29 cm)

paper) as well as to permit facile mounting of the belt onto a rigid drum. For electrophotographic imaging machines dedicated to forming images on envelopes, calling cards and the like, the outer circumference of the seamed belt should have a surface area at least sufficient for positioning conventional precessing stations such as a cleaning blade, a charging device, a development station, an erase lamp, and the like around the belt assembly.

There is no apparent maximum limit to the circumference of the inner surface of the belt. However, with larger circumferences, handling of the belt during the circumferential stretching and mounting steps may become somewhat difficult for a single worker. Normally, there is considerable latitude as to the circumferential dimension of the belt selected. Typically, for electrostatographic imaging applications, the circumference of the belt is slightly greater than about 8.5 inches (22 cm) to accommodate imaging on common receiving member surfaces. Typical circumferences for a seamed electrostatographic imaging belt are between about 22 cm and about 130 cm. A preferred range is between about 23 cm and about 110 cm. Optimum results are achieved with a range between about 45 cm and about 90 cm. If the belt is seamless, the inner circumference of electrostatographic imaging belts can be very small because there is no seam to disrupt the images being transferred to the receiving member, e.g. a standard letter size sheet. From a theoretical point of view, the inner circumference of the belt could be as small as the height of images in two adjacent lines plus the space between the lines. This allows formation of the images in one line while developed images from the other line are being transferred. In more practical applications, a satisfactory inner circumferential dimension for a seamless electrostatographic imaging belt is at least about 8 cm. When the inner circumference is less than about 8 cm, the free space available may not be sufficient for positioning all subsystems such as a cleaning blade, charging device, development station, erase lamp (in the case of electrophotography) and the like around the belt/drum combination or the mechanical rigidity and strength of the thin drum wall may not be sufficient to resist the compression pressure exerted by the belt after mounting. Also, bending of a small circumference drum may occur when supported at each end in any imaging machine. Preferably the inner circumference of the belt is at least about 10 cm. Optimum results are achieved with a belt having an inner circumference of at least about 12 cm.

Any suitable belt thickness may be utilized so long as a radial compression pressure of at least about 0.1 psi (7 gms/cm$^2$) can be achieved at the inner surface of the belt after it has been mounted on the rigid cylindrical support drum and the fluid pressure has been released. Adequate compression pressure is important to prevent the mounted belt from slipping on the rigid cylindrical support drum during use. Slippage of the belt on the rigid cylindrical support drum renders the cylindrical device unsuitable for electrostatographic imaging members, fuser rolls, drive rollers, and the like. More specifically, slippage can adversely affect registration of images in electrostatographic imaging processes, particularly where multiple images must be precisely registered with each other such as in demanding color imaging applications. Also, when welded belt seams encounter slippage, undesirable sophisticated detection systems would be required to ensure that images are not formed on the seam when the seam shifts due to slippage. Typical belt thicknesses fall with the range of between about 25 micrometers and about 250 micrometers. A preferred thickness is between about 50 micrometers and about 200 micrometers. An optimum belt thickness is between about 75 micrometers and about 130 micrometers.

The electrostatographic imaging belt may comprise only a single imaging layer if the imaging layer is sufficiently flexible and self supporting and can achieve the desired compressive pressure of at least about 0.1 psi (7 gms/cm$^2$) in a radial direction onto the outer surface of the rigid cylindrical support drum after it has been mounted on the drum. Electrostatographic flexible belt imaging members are well known in the art. The imaging member belt may be seamed or seamless. Typically, a flexible substrate is provided having an electrically conductive surface. For electrophotographic imaging members, at least one photoconductive layer is then applied to the electrically conductive surface. A charge blocking layer may be applied to the electrically conductive layer prior to the application of the photoconductive layer. If desired, an adhesive layer may be utilized between the charge blocking layer and the photoconductive layer. For multilayered photoreceptors, a charge generation binder layer is usually applied onto an adhesive layer, if present, or directly over the blocking layer, and a charge transport layer is subsequently formed on the charge generation layer. For ionographic imaging members, an electrically insulating dielectric imaging layer is applied to the electrically conductive surface. The substrate may contain an optional anti-curl back coating on the side opposite from the side bearing the charge transport layer or dielectric imaging layer.

The belt substrate may be opaque or substantially transparent and may comprise numerous suitable materials having the required mechanical properties. Accordingly, the substrate may comprise a layer of an electrically non-conductive or conductive material such as an inorganic or an organic composition. As electrically non-conducting materials, there may be employed various resins known for this purpose including polyesters, polycarbonates, polyamides, polyurethanes, polysulfones, and the like which are flexible as thin webs. The electrically insulating or conductive substrate should be flexible and in the form of an endless flexible belt. Preferably, the endless flexible belt shaped substrate comprises a commercially available biaxially oriented polyester known as Mylar, available from E. I. du Pont de Nemours & Co. or Melinex available from ICI Americas, Inc. or Hostaphan, available from American Hoechst Corporation.

The thickness of the substrate layer depends on numerous factors, including beam strength and economical considerations, and thus this layer for a flexible belt may be of substantial thickness, for example, about 175 micrometers, or of minimum thickness less than 50 micrometers, provided there are no adverse effects on the final electrostatographic device. In one flexible belt embodiment, the thickness of this layer ranges from about 65 micrometers to about 150 micrometers, and preferably from about 75 micrometers to about 100 micrometers for optimum flexibility and minimum stretch when cycled around small diameter rollers, e.g. 19 millimeter diameter rollers.

The conductive layer may vary in thickness over substantially wide ranges depending on the optical transparency and degree of flexibility desired for the electrostatographic member. Accordingly, for a flexible photoresponsive imaging device, the thickness of the conductive layer may be between about 20 angstrom units to about 750 angstrom units, and more preferably from about 100 Angstrom units to about 200 angstrom units for an optimum combination of electrical conductivity, flexibility and light transmission. The flexible conductive layer may be an electrically conductive metal layer formed, for example, on the substrate by any suitable coating technique, such as a vacuum depositing technique. Typical metals include aluminum, zirconium, niobium, tantalum, vanadium and hafnium, titanium, nickel, stainless steel, chromium, tungsten, molybdenum, and the like. Regardless of the technique employed to form the metal layer, a thin layer of metal oxide forms on the outer surface of most metals upon exposure to air. Thus, when other layers overlying the metal layer are characterized as "contiguous" layers, it is intended that these overlying contiguous layers may, in fact, contact a thin metal oxide layer that has formed on the outer surface of the oxidizable metal layer. Generally, for rear erase exposure through an transparent rigid cylindrical support drum, a conductive layer light transparency of at least about 15 percent is desirable. The conductive layer need not be limited to metals. Other examples of conductive layers may be combinations of materials such as conductive indium tin oxide as a transparent layer for light having a wavelength between about 4000 Angstroms and about 7000 Angstroms or a transparent copper iodide (CuI) or a conductive carbon black dispersed in a plastic binder as an opaque conductive layer. A typical electrical conductivity for conductive layers for electrophotographic imaging members in slow speed copiers is about $10^2$ to $10^3$ ohms/square.

After formation of an electrically conductive surface, a charge blocking layer may be applied thereto to photoreceptors. Generally, electron blocking layers for positively charged photoreceptors allow holes from the imaging surface of the photoreceptor to migrate toward the conductive layer. Any suitable blocking layer capable of forming an electronic barrier to holes between the adjacent photoconductive layer and the underlying conductive layer may be utilized. The blocking layer may be nitrogen containing siloxanes or nitrogen containing titanium compounds as disclosed, for example, in U.S. Pat. Nos. 4,291,110, 4,338,387, 4,286,033 and 4,291,110. The disclosures of U.S. Pat. Nos. 4,338,387, 4,286,033 and 4,291,110 are incorporated herein in their entirety. A preferred blocking layer comprises a reaction product between a hydrolyzed silane and the oxidized surface of a metal ground plane layer. The blocking layer may be applied by any suitable conventional technique such as spraying, dip coating, draw bar coating, gravure coating, silk screening, air knife coating, reverse roll coating, vacuum deposition, chemical treatment and the like. For convenience in obtaining thin layers, the blocking layers are preferably applied in the form of a dilute solution, with the solvent being removed after deposition of the coating by conventional techniques such as by vacuum, heating and the like. The blocking layer should be continuous and have a thickness of less than about 0.2 micrometer because greater thicknesses may lead to undesirably high residual voltage.

An optional adhesive layer may be applied to the hole blocking layer. Any suitable adhesive layer well known in the art may be utilized. Typical adhesive layer materials include, for example, polyesters, dupont 49,000 (available from E. I. dupont de Nemours and Company), Vitel PE-100 (available from Goodyear Tire & Rubber), polyurethanes, and the like. Satisfactory results may be achieved with adhesive layer thickness between about 0.05 micrometer (500 angstroms) and about 0.3 micrometer (3,000 angstroms). Conventional techniques for applying an adhesive layer coating mixture to the charge blocking layer include spraying, dip coating, roll coating, wire wound rod coating, gravure coating, Bird applicator coating, and the like. Drying of the deposited coating may be effected by any suitable conventional technique such as oven drying, infra red radiation drying, air drying and the like.

Any suitable photogenerating layer may be applied to the adhesive blocking layer which can then be overcoated with a contiguous hole transport layer as described hereinafter. Examples of typical photogenerating layers include inorganic photoconductive particles such as amorphous selenium, trigonal selenium, and selenium alloys selected from the group consisting of selenium-tellurium, selenium-tellurium-arsenic, selenium arsenide and mixtures thereof, and organic photoconductive particles including various phthalocyanine pigments such as the X-form of metal free phthalocyanine described in U.S. Pat. No. 3,357,989, metal phthalocyanines such as vanadyl phthalocyanine and copper phthalocyanine, dibromoanthanthrone, squarylium, quinacridones, dibromo anthanthrone pigments, benzimidazole perylene, substituted 2,4-diamino-triazines disclosed in U.S. Pat. No. 3,442,781, polynuclear aromatic quinones, and the like dispersed in a film forming polymeric binder. Multi-photogenerating layer compositions may be utilized where a photoconductive layer enhances or reduces the properties of the photogenerating layer. Examples of this type of configuration are described in U.S. Pat. No. 4,415,639, the entire disclosure of this patent being incorporated herein by reference. Other suitable photogenerating materials known in the art may also be utilized, if desired.

Any suitable polymeric film forming binder material may be employed as the matrix in the photogenerating binder layer. Typical polymeric film forming materials include those described, for example, in U.S. Pat. No. 3,121,006, the entire disclosure of which is incorporated herein by reference. Thus, typical organic polymeric film forming binders include thermoplastic and thermosetting resins such as polycarbonates, polyesters, polyamides, polyurethanes, polystyrenes, polyarylethers, polyarylsulfones, polybutadienes, polysulfones, polyethersulfones, polyethylenes, polypropylenes, polyimides, polymethylpentenes, polyphenylene sulfides, polyvinyl acetate, polysiloxanes, polyacrylates, polyvinyl acetals, polyamide imides, amino resins, phenylene oxide resins, terephthalic acid resins, phenoxy resins, epoxy resins, phenolic resins, polystyrene and acrylonitrile copolymers, polyvinylchloride, vinylchloride and vinyl acetate copolymers, acrylate copolymers, alkyd resins, cellulosic film formers, poly(amideimide), styrene-butadiene copolymers, vinylidenechloride-vinylchloride copolymers, vinylacetate-vinylidenechloride copolymers, styrene-alkyd resins, polyvinylcarbazole, and the like. These polymers may be block, random or alternating copolymers.

The photogenerating composition or pigment is present in the resinous binder composition in various amounts, generally, however, from about 5 percent by volume to about 90 percent by volume of the photogenerating pigment is dispersed in about 10 percent by volume to about 95 percent by volume of the resinous binder, and preferably from about 20 percent by volume to about 30 percent by volume of the photogenerating pigment is dispersed in about 70 percent by volume to about 80 percent by volume of the resinous binder composition. In one embodiment about 8 percent by volume of the photogenerating pigment is dispersed in about 92 percent by volume of the resinous binder composition.

The photogenerating layer containing photoconductive compositions and/or pigments and the resinous binder material generally ranges in thickness of between about 0.1 micrometer and about 5.0 micrometers, and preferably has a thickness of from about 0.3 micrometer to about 3 micrometers. The photogenerating layer thickness is related to binder content. Higher binder content compositions generally require thicker layers for photogeneration. Thicknesses outside these ranges can be selected providing the objectives of the present invention are achieved.

Any suitable and conventional technique may be utilized to mix and thereafter apply the photogenerating layer coating mixture. Typical application techniques include spraying, dip coating, roll coating, wire wound rod coating, and the like. Drying of the deposited coating may be effected by any suitable conventional technique such as oven drying, infra red radiation drying, air drying and the like.

The active charge transport layer may comprise an activating compound useful as an additive dispersed in electrically inactive polymeric materials making these materials electrically active. These compounds may be added to polymeric materials which are incapable of supporting the injection of photogenerated holes from the generation material and incapable of allowing the transport of these holes therethrough. This will convert the electrically inactive polymeric material to a material capable of supporting the injection of photogenerated holes from the generation material and capable of allowing the transport of these holes through the active layer in order to discharge the surface charge on the active layer. An especially preferred transport layer employed in one of the two electrically operative layers in the multilayered photoconductor of this invention comprises from about 25 percent to about 75 percent by weight of at least one charge transporting aromatic amine compound, and about 75 percent to about 25 percent by weight of a polymeric film forming resin in which the aromatic amine is soluble.

The charge transport layer forming mixture preferably comprises an aromatic amine compound.

Examples of charge transporting aromatic amines represented by the structural formulae above for charge transport layers capable of supporting the injection of photogenerated holes of a charge generating layer and transporting the holes through the charge transport layer include triphenylmethane, bis(4-diethylamine-2-methylphenyl)phenylmethane; 4'-4"-bis(diethylamino)-2',2"-dimethyltriphenylmethane, N,N'-bis(alkylphenyl)-[1,1'-biphenyl]-4,4'-diamine wherein the alkyl is, for example, methyl, ethyl, propyl, n-butyl, etc., N,N'-diphenyl-N,N'-bis(chlorophenyl)-[1,1'-biphenyl]-4,4'-diamine, N,N'-diphenyl-N,N'-bis(3"-methylphenyl)-(1,1'-biphenyl)-4,4'-diamine, and the like dispersed in an inactive resin binder.

Any suitable inactive thermoplastic resin binder soluble in methylene chloride or other suitable solvent may be employed in the process of this invention to form the thermoplastic polymer matrix of the imaging member. Typical inactive resin binders soluble in methylene chloride include polycarbonate resin, polyvinylcarbazole, polyester, polyarylate, polyacrylate, polyether, polysulfone, polystyrene, and the like. Molecular weights can vary from about 20,000 to about 150,000.

Any suitable and conventional technique may be utilized to mix and thereafter apply the charge transport layer coating mixture to the charge generating layer. Typical application techniques include spraying, dip coating, roll coating, wire wound rod coating, and the like. Drying of the deposited coating may be effected by any suitable conventional technique such as oven drying, infra red radiation drying, air drying and the like.

Generally, the thickness of the charge transport layer is between about 10 to about 50 micrometers, but thicknesses outside this range can also be used. The hole transport layer should be an insulator to the extent that the electrostatic charge placed on the hole transport layer is not conducted in the absence of illumination at a rate sufficient to prevent formation and retention of an electrostatic latent image thereon. In general, the ratio of the thickness of the hole transport layer to the charge generator layer is preferably maintained from about 2:1 to 200:1 and in some instances as great as 400:1.

The preferred electrically inactive resin materials are polycarbonate resins having a molecular weight from about 20,000 to about 150,000, more preferably from about 50,000 to about 120,000. The material most preferred as the electrically inactive resin material is poly(4,4'-dipropylidene-diphenylene carbonate) with a molecular weight of from about 35,000 to about 40,000, available as Lexan 145 from General Electric Company; poly(4,4'-isopropylidene-diphenylene carbonate) with a molecular weight of from about 40,000 to about 45,000, available as Lexan 141 from the General Electric Company; a polycarbonate resin having a molecular weight of from about 50,000 to about 120,000, available as Makrolon from Farbenfabricken Bayer A. G. and a polycarbonate resin having a molecular weight of from about 20,000 to about 50,000 available as Merlon from Mobay Chemical Company. Methylene chloride solvent is a desirable component of the charge transport layer coating mixture for adequate dissolving of all the components and for its low boiling point.

Examples of photosensitive members having at least two electrically operative layers include the charge generator layer and diamine containing transport layer members disclosed in U.S. Pat. Nos. 4,265,990, 4,233,384, 4,306,008, 4,299,897 and 4,439,507. The disclosures of these patents are incorporated herein in their entirety. The photoreceptors may comprise, for example, a charge generator layer sandwiched between a conductive surface and a charge transport layer as described above or a charge transport layer sandwiched between a conductive surface and a charge generator layer.

If desired, a charge transport layer may comprise electrically active resin materials instead of or mixtures of inactive resin materials with activating compounds. Electrically active resin materials are well known in the art. Typical electrically active resin materials include, for example, polymeric arylamine compounds and related polymers described in U.S. Pat. Nos. 4,801,517, 4,806,444, 4,818,650, 4,806,443 and 5,030,532. Polyvinylcarbazole and derivatives of Lewis acids described in U.S. Pat. No. 4,302,521. Electrically active polymers also include polysilylenes such as described in U.S. Pat.

No. 3,972,717. Other polymeric transport materials include poly-1-vinylpyrene, poly-9-vinylanthracene, poly-9-(4-pentenyl)-carbazole, poly-9-(5-hexyl)-carbazole, polymethylene pyrene, poly-1-(pyrenyl)-butadiene, polymers such as alkyl, nitro, amino, halogen, and hydroxy substitute polymers such as poly-3-amino carbazole, 1,3-dibromo-poly-N-vinyl carbazole and 3,6-dibromo-poly-N-vinyl carbazole and numerous other transparent organic polymeric transport materials as Described in U.S. Pat. No. 3,870,516. The disclosures of each of the patents identified above pertaining to binders having charge transport capabilities are incorporated herein by reference in their entirety.

Other layers such as a conventional electrically conductive ground strip may be utilized along one edge of the belt in contact with the conductive layer, blocking layer, adhesive layer or charge generating layer to facilitate connection of the electrically conductive layer of the electrostatographic imaging member to ground or to an electrical bias through typical contact means such as a conductive brush, conductive leaf spring, and the like. Ground strips are well known and usually comprise conductive particles dispersed in a film forming binder. If the rigid cylindrical support drum is electrically conductive, e.g. is metallic, the ground strip may be electrically connected to the drum by various means such as a stripe of any suitable electrically conductive glue or paint which extends from the ground strip located on the outwardly facing edge of the belt around to the back of the belt. The electrically conductive rigid cylindrical drum would, of course, function as a path through the drum support shaft to ground or to an electrical bias source. Typical electrically conductive glues or paints comprise a film forming binder such as an epoxy or polyester resin highly loaded with dispersed electrically conductive particles such as silver powder. Alternatively, any suitable electrically conductive adhesive tape such as an aluminum tape may be utilized to connect the ground strip to the conductive support drum. One end of the tape can be attached to the ground strip and the other end can be attached to the drum or to the rear surface of the belt. Electrically conductive adhesive tapes are available commercially, e.g. No. 3142 available from Richards, Parents and Murray, Inc. In another embodiment, a small segment of the ground strip can be removed to expose the underlying conductive surface of the drum. An electrically conductive tape, paint or other suitable means may then be employed to connect the exposed conductive surface of the drum to the adjacent ground strip. In still another embodiment, a portion of the ground strip may be slit to allow folding of part of the ground strip so that the ground strip on the folded portion faces and is in direct electrical contact with the drum surface. It is preferred that these connectors not be applied to imaging areas of the electrostatographic imaging belt where they could interfere with imaging, cleaning, transfer or the like. No grounding strip is needed in connection with electrically conductive rigid cylindrical support drums if an electrostatographic imaging member belt comprises only a charge generating layer and charge transport layer, or only a dielectric imaging layer, or if the belt comprises an electrically conductive flexible substrate such as nickel or steel which is in direct contact with the electrically conductive support drum.

Optionally, an overcoat layer may also be utilized to protect the charge transport layer and improve resistance to abrasion. In some cases an anti-curl back coating may be applied to the rear side of the substrate to provide flatness and/or abrasion resistance. These overcoating and anti-curl back coating layers are well known in the art and may comprise thermoplastic organic polymers or inorganic polymers that are electrically insulating or slightly semi-conductive. Overcoatings are continuous and generally have a thickness of less than about 10 micrometers. The thickness of anti-curl backing layers should be sufficient to substantially balance the total curling forces of the imaging layer or layers on the opposite side of the supporting substrate layer.

Other typical electrophotographic imaging belts comprise a flexible electroformed nickel substrate, an adhesive layer and a vacuum deposited selenium alloy layer such as disclosed in U.S. Pat. No. 3,713,821, the entire disclosure thereof being incorporated herein by reference.

For electrographic imaging members, a flexible dielectric layer overlying the conductive layer may be substituted for the active photoconductive layers. Any suitable, conventional, flexible, stretchable, electrically insulating, thermoplastic dielectric polymer matrix material may be used in the dielectric layer of the electrographic imaging member. Typical electrographic imaging members are described in U.S. Pat. No. 5,073,434, the entire disclosure thereof being incorporated herein by reference.

For fuser rolls, the belt is normally an adhesive polymer that is flexible and stretchable. Typical adhesive polymers include tetrafluoroethylene, polysiloxane, fluorinated polyethylene (e.g., Vitons), waxy polyethylene, waxy polypropylene, and the like such as disclosed in U.S. Pat. Nos. 4,196,256 and 5,049,444, the entire disclosures thereof being incorporated herein by reference.

Any suitable rigid cylindrical support drum may be utilized. Preferably, the drum is rigid. The drum may comprise any suitable inorganic material, organic material, or a combination of inorganic and organic materials. Typical inorganic drums comprise, for example, a metal such as aluminum. Typical organic drums comprise a thermoplastic resin or thermosetting resins. The resulting resin drum may contain a filler or fillers if desired. The region of the outer surface of the rigid cylindrical support drum underlying the belt should be substantially free of any irregularities which would distort the imaging surface of the electrostatographic imaging belt and adversely affect the quality of toner images formed on the imaging surface. Thus, for example, the particle size of any fillers used in a resin drum should sufficiently small so that the fillers do not project so far above the outer average surface of the drum that it adversely affects the quality of toner images formed on the imaging surface. The structural strength of the support drum should be sufficient to permit the drum to remain rigid and resist deformation during and after mounting of the belt onto the drum. In other words, the structural strength should be sufficient to prevent thin walled support drums from buckling under the compression pressure exerted by the belt after belt mounting or bending when the belt/drum assembly is supported only at its ends in an imaging device.

The circumference size selected for the rigid cylindrical support drum depends upon the arc distant of the imaging surface of the belt. Thus, if a welded belt is utilized and the minimum size of the receiving member to be imaged is 8.5 inches (21.6 cm), the outer circumference of the rigid cylindrical support member should be at least about 22 cm. For a seamless belt, the outer circumference should be at least about 8 cm. The length of the supporting rigid cylinder may be slightly less, the same as, or slightly greater than the width of the belt. However, it is preferred that the surface of the drum underlies at least the imaging areas of the belt.

The rigid cylindrical support drum may be fitted with apertures on the outer periphery of the drum at one end of the drum, to introduce channeled streams of fluid under pressure into the region between the belt and the outer surface of the rigid cylindrical support drum to facilitate stretching of the belt during mounting of the belt onto the drum. Alternatively, an adjacent auxiliary mounting cylinder or ring may be utilized as a source of compressed fluid to stretch the belt during mounting of the belt onto the supporting cylindrical substrate. The size and number of apertures to be utilized in either the rigid cylindrical support drum substrate or in the auxiliary mounting drum or ring for stretching of the belt during the belt mounting process should be sufficient to achieve an equilibrium fluid pressure and the between the outer surface of the drum and the inner surface of the belt. Satisfactory results may be achieved when the equilibrium pressure of the fluid is between about 0.4 psi (28.2 gms/cm$^2$) and about 5 psi (352 gms/cm$^2$). Preferably, the equilibrium fluid pressure is between about 0.7 psi (49.3 gms/cm$^2$) and about 4 psi (282 gms/cm$^2$). Optimum results are achieved when the equilibrium pressure is between about 1 psi (70.4 gms/cm$^2$) and about 3.5 psi (246.3 gms/cm$^2$). For an imaging belt having a thickness of about 120 micrometers and a Young's Modulus of about $5.0 \times 10^5$ psi ($3.52 \times 10^7$ gms/cm$^2$), the equilibrium fluid pressure required should be sufficient to stretch the circumferential dimension of the belt to an expanded circumferential dimension of at least about 0.1 percent greater than the outer circumference of the rigid cylindrical support drum but less than the elastic limit of the belt. The amount of equilibrium fluid pressure desired depends upon how readily the belt stretches which, in turn, is determined by the thickness of the belt and its Young's Modulus.

Generally, the mounting of the belts onto a rigid cylindrical support drum is a accomplished at temperatures below the deformation temperature of all components of the preformed flexible belt. For example, the mounting should preferably be undertaken at temperatures below the glass transition temperature of an polymeric component of the preformed belt. This ensures that the preformed flexible belt has an inner circumference of at least about 0.05 percent smaller than the outer circumference of the drum to achieve the desired compression pressure of at least about 0.1 psi (7 gms/cm$^2$) at the inner surface of the belt in a radial direction onto the outer surface of the support drum after the belt has been mounted on the support drum and the fluid pressure has been released. This ensures that the frictional force between the belt and the rigid cylindrical support drum is sufficient to overcome the tangential force arising from mechanical interaction forces while the mounted belt is being used in a machine. Embodiments of the belt/drum of the present invention are illustrated in Working Examples I through V and the calculations for determining compression pressure are in Working Example V below.

Any suitable aperture shape may be utilized. Typical aperture shapes include round, oval, square, triangular, slotted, rhombic, rectangular, trapezoidal, and the like and combinations thereof. Generally, the apertures are positioned adjacent to the belt mounting end of the rigid cylindrical support drum. Thus, the apertures may be formed in the rigid cylindrical support drum itself or in an adjacent auxiliary mounting cylinder or mounting ring (essentially a shortened mounting cylinder), if an auxiliary mounting cylinder or mounting ring is utilized for belt transport. Moreover, where a mounting ring or mounting cylinder is employed, apertures may be employed in both the rigid cylindrical support drum and in the mounting ring or cylinder. In addition, one or more rows of apertures may be used in the rigid supporting drum and/or mounting ring or mounting cylinder. Any suitable number of apertures may be utilized around the periphery of the rigid supporting drum, mounting ring or mounting cylinder. Generally sufficient apertures should be utilized to achieve the desired equilibrium pressure for stretching of the belt. Generally, large diameter apertures are less desirable because large dimples can form on the outer surface of the belt after the fluid pressure has been removed and the belt has been allowed to shrink against the rigid supporting substrate. When an end of the rigid cylindrical support drum contains a plurality of circumferentially located apertures and an edge of an imaging belt overlies the apertures, the apertures should preferably not be under the region of the belt that will be used for imaging because the underlying apertures can cause distortion of the imaging surface of the belt.

Any suitable fluid may be utilized to stretch the belt. Typical fluids include air, nitrogen, carbon dioxide, argon, helium, fluorocarbon, chlorofluorocarbon, water, alcohol, and the like. Air is preferred because it is inexpensive, non-toxic and leaves no residual debris. The fluid may be compressible or non-compressible. Generally, the fluid is supplied to manifolds which feed the fluid to the apertures. Generally, the interior volume of the manifolds is small to minimize the volume of fluid required and to maximize the effect of belt stretching speed. Any suitable means may be utilized to regulate the pressure supplied to the inner manifolds. Typical regulating means include, for example, conventional pressure regulator valves.

The fluid may be supplied from any suitable source such as a storage tank, electrical or mechanical compressor, a turbo compressor, pressurized cylinder and the like. Although a pulsating of fluid may be utilized, the fluid source supplying fluid under conventionally uniform pressure is preferred. Although a variety of compressed gases and liquids have been identified above, however, gases such as air and nitrogen are generally the preferred fluids from cost and ease of handling considerations.

If desired, the rigid cylindrical support drum may be fitted with several means at the end of the drum opposite the mounting end to stop the belt as it is slid onto the drum. Any suitable belt stopping means may be utilized such as pegs, tape, ridge, pins, and the like.

Thus, the imaging members of this invention achieve more precise tolerances, can be readily recycled, are less expensive, extend the cycling life of belts and the like.

The invention will now be described in detail with respect to specific preferred embodiments thereof, it being noted that these examples are intended to be illustrative only and are not intended to limit the scope of the present invention. Parts and percentages are by weight unless otherwise indicated.

EXAMPLE I

A photoconductive imaging member web was prepared by providing a titanium coated polyester (Melinex, available from ICI Americas Inc.) substrate having a thickness of 3 mils (76.2 micrometers) and applying thereto, using a gravure applicator, a solution containing 50 gms 3-aminopropyltriethoxysilane, 50.2 gms distilled water, 15 gms acetic acid, 684.8 gms of 200 proof denatured alcohol and 200 gms heptane. This layer was then allowed to dry for 5 minutes at 135° C. in a forced air oven. The resulting blocking layer had a dry thickness of 0.05 micrometer.

An adhesive interface layer was then prepared by applying with a gravure applicator to the blocking layer a wet coating containing 5 percent by weight based on the total weight of the solution of polyester adhesive (DuPont 49,000, available for E. I. du Pont de Nemours & Co.) in a 70:30 volume ratio mixture of tetrahydrofuran/cyclohexanone. The adhesive interface layer was allowed to dry for 5 minutes at 135° C. in a forced air oven. The resulting adhesive interface layer had a dry thickness of 0.07 micrometer.

The adhesive interface layer was thereafter coated with a photogenerating layer containing 7.5 percent by volume trigonal Se, 25 percent by volume N,N'-diphenyl-N,N'-bis(3-methylphenyl)-1,1'-biphenyl-4,4'-diamine, and 67.5 percent by volume polyvinylcarbazole. This photogenerating layer was prepared by introducing 8 gms polyvinyl carbazole and 140 mls of a 1:1 volume ratio of a mixture of tetrahydrofuran and toluene into a 20 oz. amber bottle. To this solution was added 8 gram of trigonal selenium and 1,000 gms of ⅛ inch (3.2 millimeter) diameter stainless steel shot. This mixture was then placed on a ball mill for 72 to 96 hours. Subsequently, 50 gms of the resulting slurry were added to a solution of 3.6 gm of polyvinyl carbazole and 2.0 gm of N,N'-diphenyl-N,N'-bis(3-methylphenyl)-1,1'-biphenyl-4,4'-diamine dissolved in 75 ml of 1:1 volume ratio of tetrahydrofuran/toluene. This slurry was then placed on a shaker for 10 minutes. The resulting slurry was thereafter applied to the adhesive interface by extrusion coating to form a layer having a wet thickness of 0.5 mil (12.7 micrometers). However, a strip about 3 mm wide along one edge of the substrate, blocking layer and adhesive layer was deliberately left uncoated by any of the photogenerating layer material to facilitate adequate electrical contact by the ground strip layer that is applied later. This photogenerating layer was dried at 135° C. for 5 minutes in a forced air oven to form a dry thickness photogenerating layer having a thickness of 2.0 microns.

This coated imaging member web was simultaneously overcoated with a charge transport layer and a ground strip layer by coextrusion of the coating materials. The charge transport layer was prepared by introducing into an amber glass bottle in a weight ratio of 1:1 N,N'-diphenyl-N,N'-bis(3-methylphenyl)-1,1'-biphenyl-4,4'-diamine and MakroIon R, a polycarbonate resin having a molecular weight of from about 50,000 to 100,000 commercially available from Farbensabricken Bayer A. G. The resulting mixture was dissolved in 15 percent by weight methylene chloride. This solution was applied on the photogenerator layer by extrusion to form a coating which upon drying had a thickness of 24 micrometers.

A strip about 3 mm wide of the adhesive layer left uncoated by the photogenerator layer was coated with a ground strip layer during the coextrusion process. The ground strip layer coating mixture was prepared by combining 23.81 gms. of polycarbonate resin (MakroIon 5705, 7.87 percent by total weight solids, available from Bayer AG), and 332 gms of methylene chloride in a carboxy container. The container was covered tightly and placed on a roll mill for about 24 hours until the polycarbonate was dissolved in the methylene chloride. The resulting solution was mixed for 15–30 minutes with about 93.89 gms. of a graphite dispersion (12.3 Percent by weight solids) of 9.41 parts by weight graphite, 2.87 parts by weight ethyl cellulose and 87.7 parts by weight solvent (Acheson Graphite dispersion RW22790, available from Acheson Colloids Company) with the aid of a high shear blade disperser in a water cooled, jacketed container to prevent the dispersion from overheating and losing solvent. The resulting dispersion was then filtered and the viscosity was adjusted with the aid of methylene chloride. This ground strip layer coating mixture was then applied to the photoconductive imaging member to a form an electrically conductive ground strip layer having a dried thickness of about 14 micrometers. This ground strip may be electrically grounded by conventional means such as a carbon brush contact means.

The resulting imaging member web containing all of the above layers was annealed at 135° C. in a forced air oven for 5 minutes.

An anti-curl coating was prepared by combining 88.2 gms of polycarbonate resin (Makrolon 5705, available from Bayer AG), 0.9 gm of polyester resin (Vitel PE-100, available from Goodyear Tire and Rubber Company) and 900.7 gms of methylene chloride in a carboxy container to form a coating solution containing 8.9 percent solids. The container was covered tightly and placed on a roll mill for about 24 hours until the polycarbonate and polyester were dissolved in the methylene chloride. 4.5 gms of silane treated microcrystalline silica was dispersed in the resulting solution with a high shear disperser to form the anti-curl coating solution. The anti-curl coating solution was then applied to the rear surface (side opposite the photogenerator layer and charge transport layer) of the photoconductive imaging member web by extrusion coating and dried at 135° C. for about 5 minutes in a forced air oven to produce a dried film having a thickness of 13.5 micrometers.

EXAMPLE II

The surface contact friction of the anti-curl coating of the photoconductive imaging member of Example I was evaluated against a smooth aluminum surface to simulate the imaging member belt/aluminum drum frictional interaction as the belt was mounted onto a rigid aluminum drum to form the desired belt/drum imaging system design.

The coefficient of friction test was conducted by fastening the photoconductive imaging member to be tested to the flat bottom surface of a horizontally sliding 200 gm weight plate, using a double sided adhesive tape, with the outer surface of the anti-curl layer facing downwardly. The weight plate bearing the anti-curl layer was dragged in a straight line against a smooth flat horizontal aluminum test surface. The weight plate was moved by a cable which had one end fastened to the weight and the other end threaded around a low friction pulley. The pulley was positioned so that the segment of the cable between the weight and the pulley was parallel to the surface of the smooth flat horizontal aluminum test surface. The cable was pulled vertically upward from the pulley by an Instron Tensile Test Instrument. The load in gms required to pull the weight plate sliding over the aluminum surface was divided by 200 gms to give a coefficient of contact friction value of 0.22.

Example III

The photoconductive imaging member web of Example I, having a width of 414 mm, was cut to a precise 591 mm length to form a rectangular sheet. The opposite ends of this imaging member sheet were overlapped 1 mm and joined by ultrasonic energy seam welding using a 40 KHz horn to form a belt having an inner circumferential dimension of 590 mm. This imaging belt was prepared to achieve an inner circumferential dimension about 0.5% smaller than the outer circumferential dimension of a rigid aluminum support drum. The belt was mounted onto the drum to serve as a belt/drum imaging system of this invention similar to that shown in FIG. 9. This mounting was successfully demonstrated by employing a pneumatic mounting technique using a compressed air source to provide an equilibrium air pressure of 4.0 psi (281.2 gms per square centimeter) to substantially expand the belt and enable belt mounting. The rigid aluminum support drum had an outer circumferential dimension of 59.3 cm and an axial length of 41.4 cm. The en d of the drum onto which the belt was slid carried 8 round holes evenly spaced around the periphery, the center of the holes being 3 mm from the end of the drum upon which the belt was slid. Each of the holes had a diameter of 2 millimeters. The opposite ends of the drum were sealed with covers. The cover furthest from the holes carried an air feed fitting to which a hose was attached. Compressed air was fed into the drum through the hose from a compressed air source with the air pressure being controlled by a pressure regulator. When the edges of the mounted belt were aligned with each end of the drum, the supply of the compressed air was terminated and the belt collapsed instantly to encircle and hug the drum.

Under the 0.5% wrap around strain, the imaging belt would (according to FIG. 25) produce a 10.81 lbs/in (1,932 gms per centimeter axial drum length) tension to cause the belt to tightly hug onto the rigid support drum. Since the aluminum support drum had a Young's modulus of $103 \times 10^5$ lbs/in$^2$ ($72.43 \times 10^7$ gms per square centimeter), it is 21 times greater than the Young's modulus of $4.9 \times 10^5$ lbs/in$^2$ ($3.446 \times 10^7$ gms per square centimeter), of the imaging belt. Furthermore, the support drum had a wall thickness of at least 100 times greater than the thickness of the imaging belt. Therefore, the rigid aluminum support drum was virtually incompressible under the pressure exerted by the belt and exhibited no dimensional changes as a result of the radial compression force arising after imaging belt mounting.

EXAMPLE IV

At a constant 0.5 percent strain, the stress-relaxation characteristic of the imaging belt as a function of time after belt mounting over the rigid drum was investigated. Simulation of the effect of the constantly imposed 0.5 percent belt strain on stress response at the imaging belt/rigid drum interface was carried out by cutting two ½ in (1.27 cm) wide by 4 in (10.16 cm) long test samples of the imaging member described in Example I for stress-relaxation measurements, one test sample at 25° C. and the other at an elevated temperature of 50° C. The 25° C. measurement was intended to capture the stress-relaxation effect during the machine off period, whereas the elevated temperature testing at 50° C. was intended to duplicate the conditions during the time that the imaging belt/drum system of the present invention was under a machine operating mode.

The first test sample was evaluated for stress-relaxation behavior with respect to time, using the test procedures below:

Insert the test sample into the upper and the lower jaws of an Instron mechanical tester, leaving a 2 in (5.08 cm) sample gage length.

Under a controlled room ambient temperature of 25° C., stretch the test sample to an instantaneous 0.5% strain.

Monitor the change in tension response at the constant imposed 0.5% sample strain for 96 hours with a chart recorder.

The stress-relaxation measurement was repeated again by following the procedures described above for the second test sample, except that the testing was carried out under the elevated temperature of 50° C. To achieve and maintain this temperature condition, the Instron jaws with the test sample were enclosed in a temperature controlled chamber for the entire duration of the stress-relaxation measurement of 48 hours.

EXAMPLE V

The results obtained from the stress-relaxation measurements, monitored and recorded as a force-time curve on chart paper of a recorder at each temperature condition of 25° C. and 50° C. described in Example IV, were introduced into the following mathematical model:

$$S_t = S_o \text{EXP} - (t/\tau)\beta$$

wherein:

$S_t$ was the imaging member belt tension response at time t.

$S_o$ was the initially imposed imaging member tension.

t was the cumulative time in hours that the imaging member was under tension.

$\tau$ was the characteristic relaxation time constant for the imaging member.

$\beta$ was a characteristic constant.

Since $S_o$ was the known instantaneous sample tension as soon as the 0.5 percent strain was imposed at the beginning of the test and unlimited values of the transient sample tension were generated using the recorded force-time curve, the constants $\tau$ and $\beta$ were conveniently calculated by using the $S_o$ and two values of $S_t$ in the mathematical model given above. Although small variations in $\tau$ and $\beta$ results were obtained for the different sets of $S_t$ used in the calculations, averaging of the values of these results gave the best representation for matching the stress-relaxation mathematical model with the experimental force-time curve. Both the $\tau$ and $\beta$ were, therefore, empirically obtained values. At ambient and elevated temperature conditions, $\tau$ and $\beta$ were:

For 25° C., $\tau = 10,251.5$ hours $\beta = 0.3066$

For 50° C., $\tau = 3,693.7$ hours $\beta = 0.2296$

Thus, since each polymer has its own $\tau$ and $\beta$ constants, the value of the $\tau$ and $\beta$ constants are determined for each different polymer.

Figure 25:
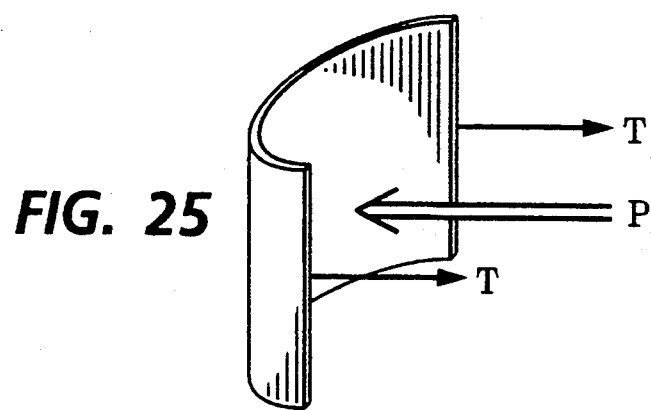
FIG. 25 is an isometric sectional view of an electrostatographic imaging belt being subjected to tension T and equilibrium pressure P.

Assuming that an imaging belt had an electrical service life of one year; with 4 months cumulative time under 50° C. and 8 months at 25° C. ambient condition, the tension stress which was still retained in the imaging belt after a year of stress-relaxation (calculated using the above mathematical model) was 35.6 percent. This corresponded to the decrease in belt tension from the original value of 10.81 lb/in (1,932 gms/cm) to 3.85 lb/in (688 gms/cm) at the end of the service life of the imaging belt. With this belt/drum combination, the system is analogous to the condition of a cylindrical pipe having a diameter D, a wall tension T, and an internal pressurized fluid at an equilibrium pressure P as illustrated in FIG. 25. Using a one inch pipe length as a basis, the force balance under equilibrium conditions is:

$$P(D)(1 \text{ in}) = 2(T)(1 \text{ in})$$

Therefore, $$P = \frac{2T}{D}$$

where:
T is the wall tension in lbs/in and
D is the diameter of the pipe in inches.

In this case, T corresponds to the imaging belt tension, D corresponds to the diameter of the aluminum support drum, and P is the compression pressure exerted by the belt over the drum surface. Accordingly, the value of this belt tension after a year of service was calculated to yield a compression pressure of 1.0363 psi (72.9 gms/cm$^2$) at the drum surface. Employing the frictional force equation:

$$F = \mu N$$

Where $\mu$, the coefficient of contact friction between the anti-curl coating of the imaging belt and the aluminum surface, was 0.22; and N, the normal force at the contacting surface, (based on the 593 millimeter circumference surface of an aluminum support drum having a length of one inch) was equal to (1.0363 lb/in$^2$) (23.3465 inch) (1 inch) or 24.19 lbs. Substituting the values of $\mu$ and N to this frictional equation, it gave: F=(0.22) (24.19 lbs)=5.32 lbs per inch axial drum length (or 950 gms per centimeter axial drum length) Since this friction force was 42.4 times greater than the 0.125 lb per inch width (22.3 gms/cm) tangential force developed at the imaging member belt surface by cleaning blade and other mechanical subsystem interactions, the present imaging belt/drum design invention concept ensures precision electrophotographic imaging performance under a service environment without encountering belt slippage.

Although the invention has been described with reference to specific preferred embodiments, it is not intended to be limited thereto, rather those skilled in the art will recognize that variations and modifications may be made therein which are within the spirit of the invention and within the scope of the claims.

What is claimed is:

1. A cylindrical electrophotographic imaging member comprising a rigid cylindrical support drum having an outer drum surface and a flexible electrophotographic imaging belt mounted on said outer drum surface, said belt having an inner belt surface and an outer belt surface, said belt being supported in tension on said outer drum surface with said outer drum surface contacting said inner belt surface, said tension of said belt exerting a compressive pressure of at least about 7 grams/cm$^2$ in a radial direction onto said outer surface of said drum.

2. A cylindrical electrophotographic imaging member according to claim 1 wherein said electrophotographic imaging belt comprises a flexible support layer, a charge generating layer and a charge transport layer.

3. A cylindrical electrophotographic imaging member according to claim 1 wherein said electrophotographic imaging belt is a seamless belt.

4. A cylindrical electrophotographic imaging member according to claim 1 wherein said electrophotographic imaging belt is a belt having a welded seam extending from one edge to the other edge in a direction parallel to the axis of said belt.

5. A cylindrical electrophotographic imaging member according to claim 1 wherein said electrophotographic imaging belt has an outer imaging surface and a non-imaging surface along one edge and said rigid cylindrical support drum has a plurality of apertures circumferentially located at only one end of said drum, and only said non-imaging surface along said edge overlies said apertures.

6. A cylindrical electrophotographic imaging member according to claim 5 wherein said non-imaging surface is electrically conductive and said outer surface of said rigid cylindrical support drum is electrically insulating.

7. A cylindrical electrophotographic imaging member according to claim 5 wherein said non-imaging surface is electrically conductive, said outer surface of said rigid cylindrical support drum is electrically conductive and an electrically conductive member extends from said non-imaging surface to said inner surface of said flexible electrophotographic imaging belt.

8. A cylindrical electrophotographic imaging member according to claim 1 wherein prior to mounting of said flexible electrophotographic imaging belt on said drum, said inner surface of said belt had a circumference at least about 0.05 percent smaller than the circumference of said outer surface of said drum.

9. An electrophotographic imaging process comprising providing a cylindrical device electrophotographic imaging member having at least one distinct outer layer comprising a flexible electrophotographic imaging belt having an inner surface and an outer imaging surface and a single rigid cylindrical support drum having an outer surface wherein said belt is supported in tension on said rigid cylindrical drum with said outer surface of said drum being in contact with said inner surface of said belt and said belt tension exerts a compressive pressure of at least about 7 grams/cm$^2$ in a radial direction onto said outer surface of said drum, forming an electrostatic latent image on said imaging surface, developing said latent image with marking material to from a marking material image corresponding to said latent image, transferring said marking material image to a receiving member and repeating said forming, developing and transferring steps at least once.

10. An electrophotographic imaging process according to claim 9 including removing said flexible electrophotographic imaging belt from said outer surface of said rigid cylindrical support drum, providing a fresh preformed flexible electrophotographic imaging belt having an inner circumference of at least about 0.05 percent smaller than the outer circumference of said drum, circumferentially expanding said fresh flexible electrophotographic imaging belt with a flowing fluid under pressure until said circumference of said inner surface of said fresh flexible electrophotographic imaging belt is stretched to a new dimension at least about 0.1 percent greater than said outer circumference of said drum while maintaining an elongation strain less than the elastic limit of said belt, sliding said fresh flexible electrophotographic imaging belt onto said drum until substantially all of said fresh flexible electrophotographic imaging belt encircles said outer surface of said drum and terminating the flow of said flowing liquid to allow said fresh flexible electrophotographic imaging belt to contract onto said outer surface of said drum.

11. An electrophotographic imaging process according to claim 10 wherein said flowing fluid under pressure is sufficient to achieve an equilibrium fluid pressure between said outer surface of said drum and said inner surface of said belt of between about 0.4 psi and about 5 psi.

* * * * *